United States Patent
Xiong et al.

(10) Patent No.: US 10,461,404 B2
(45) Date of Patent: Oct. 29, 2019

(54) TERMINAL HOUSING AND TERMINAL

(71) Applicant: Beijing Xiaomi Mobile Software Co., Ltd., Haidian District, Beijing (CN)

(72) Inventors: Xiaofeng Xiong, Beijing (CN); Zonglin Xue, Beijing (CN); Linchuan Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 150 days.

(21) Appl. No.: 15/597,121

(22) Filed: May 16, 2017

(65) Prior Publication Data
US 2017/0338548 A1    Nov. 23, 2017

(30) Foreign Application Priority Data
May 17, 2016 (CN) .......................... 2016 1 0326989

(51) Int. Cl.
*H01Q 1/24* (2006.01)
*H01Q 1/38* (2006.01)
(Continued)

(52) U.S. Cl.
CPC .............. *H01Q 1/243* (2013.01); *H01Q 1/38* (2013.01); *H01Q 1/40* (2013.01); *H01Q 1/42* (2013.01);
(Continued)

(58) Field of Classification Search
CPC ............ H01Q 1/243; H01Q 1/38; H01Q 1/40; H01Q 1/42; H01Q 1/48; H01Q 1/526; H01Q 9/0421; H01Q 21/28
See application file for complete search history.

(56) References Cited

U.S. PATENT DOCUMENTS 3,643,007 A * 2/1972 Roberts .............. H01B 11/1808
                                                          174/106 R
5,121,127 A    6/1992 Toriyama
(Continued)

FOREIGN PATENT DOCUMENTS

CN        201247808 Y    5/2009
CN        101728630 A    6/2010
(Continued)

OTHER PUBLICATIONS

The First Office Action in European application No. 17169711.3, dated Aug. 29, 2018.
(Continued)

*Primary Examiner* — Dieu Hien T Duong
(74) *Attorney, Agent, or Firm* — Jun He Law Offices P.C.; James J. Zhu

(57) ABSTRACT

A terminal housing and a terminal are provided. The terminal housing includes: a metal back cover, the metal back cover including an opening and the outer surface of the metal back cover being overlaid with a nonconductive material; a printed circuit board (PCB) arranged on the inner surface of the metal back cover; a plurality of antenna units arranged on the nonconductive material, each of the plurality of antenna units including: a ground portion, the ground portion passing through the nonconductive material and being connected with the outer surface of the metal back cover; and a feed portion, the feed portion being connected with a radio frequency (RF) front-end of the PCB via a shield wire, the shield wire passing through the nonconductive material and entering into the terminal housing via the opening.

15 Claims, 4 Drawing Sheets

(51) Int. Cl.
*H01Q 1/40* (2006.01)
*H01Q 1/42* (2006.01)
*H01Q 9/04* (2006.01)
*H01Q 21/28* (2006.01)
*H01Q 1/48* (2006.01)
*H01Q 1/52* (2006.01)
*H04M 1/02* (2006.01)

(52) U.S. Cl.
CPC ............... *H01Q 1/48* (2013.01); *H01Q 1/526* (2013.01); *H01Q 9/0421* (2013.01); *H01Q 21/28* (2013.01); *H04M 1/0277* (2013.01); *H04M 1/0283* (2013.01); *H04M 2250/06* (2013.01); *H04M 2250/10* (2013.01)

(56) References Cited

U.S. PATENT DOCUMENTS

| | | | | |
|---|---|---|---|---|
| 5,365,246 | A * | 11/1994 | Rasinger | H01Q 1/243 343/702 |
| 6,346,913 | B1 * | 2/2002 | Chang | H01Q 9/0407 343/700 MS |
| 6,531,985 | B1 * | 3/2003 | Jones | G06F 1/1616 343/700 MS |
| 6,731,920 | B1 * | 5/2004 | Iwai | H01Q 1/243 343/702 |
| 2005/0200535 | A1 * | 9/2005 | Elkobi | H01Q 1/243 343/702 |
| 2007/0241971 | A1 | 10/2007 | Tsujimura et al. | |
| 2008/0316121 | A1 | 12/2008 | Hobson | |
| 2009/0146906 | A1 * | 6/2009 | Anguera Pros | H01Q 5/371 343/906 |
| 2012/0235635 | A1 * | 9/2012 | Sato | H01Q 1/243 320/108 |
| 2013/0076573 | A1 | 3/2013 | Rappoport et al. | |
| 2014/0071019 | A1 * | 3/2014 | Lim | H01Q 1/243 343/873 |
| 2014/0300518 | A1 | 10/2014 | Ramachandran et al. | |

FOREIGN PATENT DOCUMENTS

| | | | |
|---|---|---|---|
| CN | 103327144 | A | 9/2013 |
| CN | 204441445 | U | 7/2015 |
| CN | 204632895 | U * | 9/2015 |
| CN | 105024136 | A | 11/2015 |
| EP | 2387102 | A2 | 11/2011 |
| FR | 2823601 | A1 | 10/2002 |
| JP | 01103302 | A * | 4/1989 |
| JP | 2001267833 | A | 9/2001 |
| JP | WO2016063759 | A1 | 6/2017 |
| WO | 2011018551 | A1 | 2/2011 |

OTHER PUBLICATIONS

The International Search Report of PCT/CN2016/094702.
Extended European Search Report for EP Application No. 17169711.3 dated Sep. 26, 2017.

* cited by examiner

TERMINAL HOUSING AND TERMINAL

CROSS-REFERENCE TO RELATED APPLICATION

This application is based on and claims priority to Chinese Patent Application No. 201610326989.4, filed on May 17, 2016, which is incorporated herein by reference in its entirety.

FIELD

The present disclosure relates to a technical field of terminal, and more particularly, to a terminal housing and a terminal.

BACKGROUND

With the development of science and technology, it's a trend to design a metal housing as the housing for a terminal. When designing a metal housing for a terminal, it may be usually designed to have a three-piece structure such that the metal housing would not affect terminal antennas transmitting and receiving signals normally. FIG. 1 illustrates a back view of a three-piece terminal housing, the metal housing is divided into three parts, and "blank band" gaps are existed between the three parts as signal outlets, such that the antennas may transmit or receive signals via the signal outlets. However, the metal housing with the "blank band" gaps is not a truly all-metal housing, which affecting the beauty of the terminal.

SUMMARY

A terminal housing and a terminal are provided by the present disclosure.

According to a first aspect of embodiments of the present disclosure, a terminal housing is provided. The terminal housing includes: a metal back cover, the metal back cover including an opening and the outer surface of the metal back cover being overlaid with a nonconductive material; a printed circuit board (PCB) arranged on the inner surface of the metal back cover; a plurality of antenna units arranged on the nonconductive material, each of the plurality of antenna units including: a ground portion, the ground portion passing through the nonconductive material and being connected with the outer surface of the metal back cover; and a feed portion, the feed portion being connected with a radio frequency (RF) front-end of the PCB via a shield wire, the shield wire passing through the nonconductive material and entering into the terminal housing via the opening.

According to a second aspect of embodiments of the present disclosure, a terminal is provided. The terminal includes the terminal housing described in the first aspect.

It is to be understood that the above general description and the following detailed description are merely for the purpose of illustration and explanation, and are not intended to limit the scope of the protection of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to example embodiments, examples of which are illustrated in the accompanying drawings. The following description refers to the accompanying drawings in which same numbers in different drawings represent same or similar elements unless otherwise described. The implementations set forth in the following description of example embodiments do not represent all implementations consistent with the present disclosure. Instead, they are merely examples of devices and methods consistent with aspects related to the present disclosure as recited in the appended claims.

Figure 1:
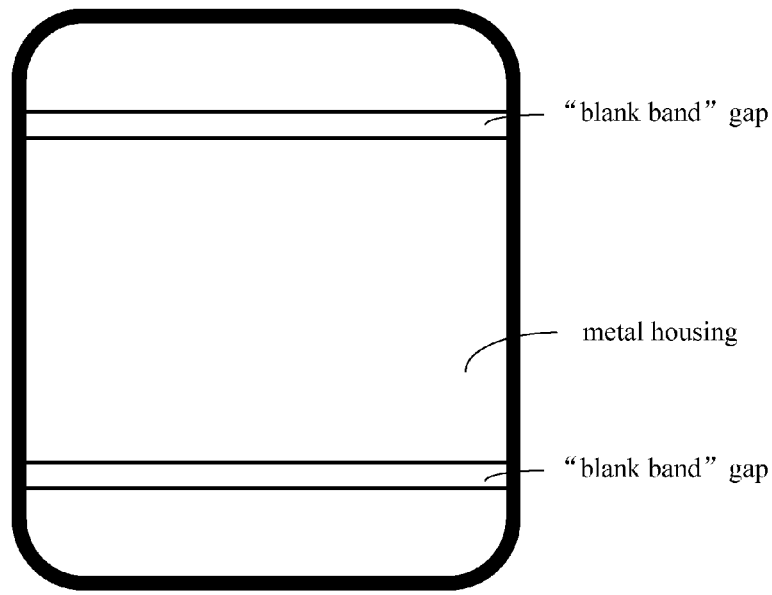
FIG. 1 is a back view of a three-piece terminal housing.
Figure 2A:
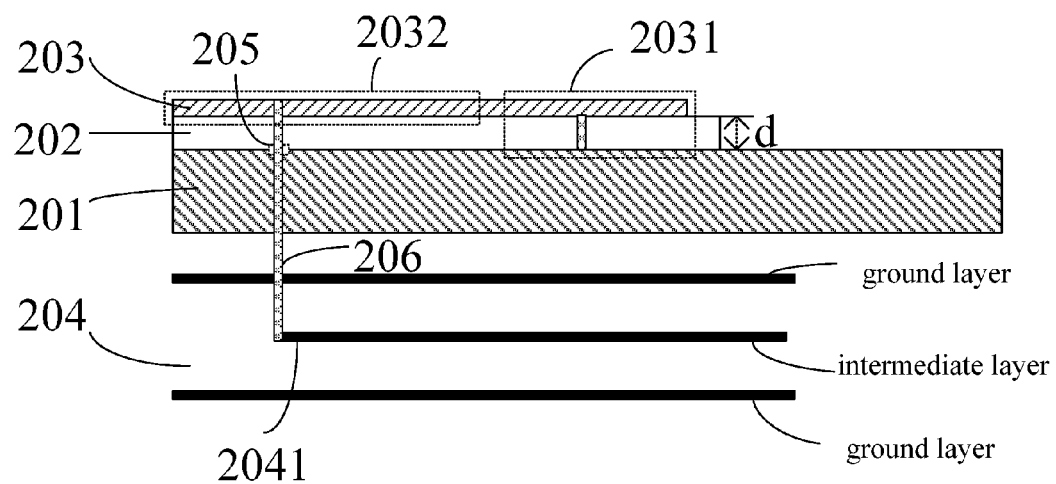
FIG. 2A is a structural schematic diagram illustrating a terminal housing according to an exemplary embodiment.
Figure 2B:
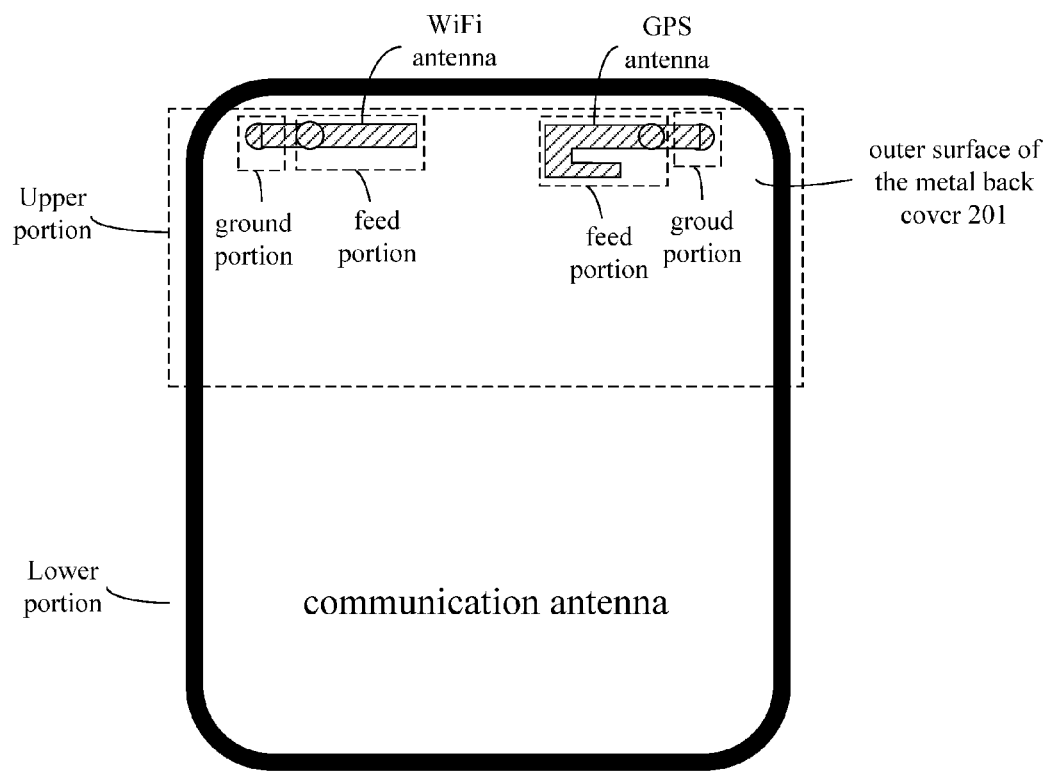
FIG. 2B is a structural schematic diagram illustrating a terminal housing according to an exemplary embodiment.

FIG. 2A and FIG. 2B are structural schematic diagrams illustrating a terminal housing according to an exemplary embodiment. FIG. 2B is a back view watched from the back of the terminal. The terminal includes a terminal housing. The terminal housing includes a metal back cover 201, a nonconductive material 202 overlaid on an outer surface of the metal back cover 201, a plurality of antenna units 203 arranged on the nonconductive material 202 and a PCB 204 arranged on the inner surface of the metal back cover 201, the metal back cover 201 includes an opening 205 thereon.

It should be noted that, for the purpose of illustrating the relationship of the antenna unit, nonconductive material and the metal back cover, only one antenna unit is shown in FIG. 2A.

Each of the plurality of antenna units 203 may include a ground portion 2031 and a feed portion 2032. The ground portion 2031 of each of the antenna units passes through the nonconductive material 202 and is connected with the outer surface of the metal back cover 201; the feed portion 2032 of each of the antenna units is connected with a radio frequency (RF) front-end 2041 of the PCB 204 via a shield wire 206, such that the antenna unit and the RF front-end 2041 may constitute a receiving path or a transmitting path to achieve the normal operation of each antenna unit. The shield wire 206 passes through the nonconductive material 202 and enters into the terminal housing via the opening 205 on the metal back cover 201, so as to connect to the RF front-end 2041. Thickness d of the nonconductive material 201 is required to be more than a designated threshold so as to ensure the radiation performance of multiple antenna units. The designated threshold may be preset by designers.

In embodiments of the present disclosure, PCB 204 is disposed on the inner surface of the metal back cover 201, inside the terminal housing and is not adhesive with the metal back cover. The PCB 204 is a strip line, which includes three layers: a top layer, a bottom layer, and an intermediate layer, wherein the top layer and the bottom layer are ground layers, and the intermediate layer is a signal layer for transmitting signals. The shield wire 206 is connected with the intermediate layer of the RF front-end 2041.

It should be noted that the RF front-end of the PCB 204 may be designed as stair-step shape, so as to ensure impedance matching between the shield wire 206 and the RF front-end 2041. The specific size of the stair-step shape may be adjusted by designers based on the radiation performance of the antenna unit, which is not concretely limited by embodiments of the present disclosure.

The ground portion of each of the antenna units may be connected with the outer surface of the metal back cover 201 in the following two ways.

In the first connection way, the ground portion of each of the antenna units is fixedly connected with the outer surface of the metal back cover 201. Fixing bolts or other conductive objects may be employed to fixedly connect them, which is not concretely limited by embodiments of the present disclosure.

In the second connection way, the ground portion of each of the antenna units is connected with the outer surface of the metal back cover 201 by surface contact, that is, the ground portion of each of the antenna units is not welted together with the outer surface of the metal back cover. The connection by surface contact may be achieved by a flexure strip or by other conductive objects by way of surface contact, which is not concretely limited by embodiments of the present disclosure. The flexure strip is a conductive object.

The conductive objects employed in the above two connections ways may be considered as a part of the ground portion.

Figure 2C:
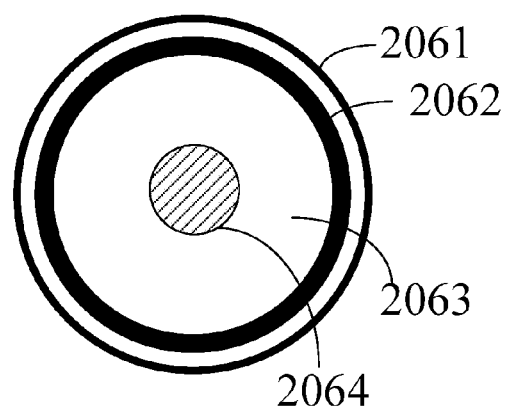
FIG. 2C is a cross-sectional diagram illustrating a coaxial wire according to an exemplary embodiment.

The shield wire 206 is used for transmitting communication signals and shielding interference of the metal back cover 201 on the communication signal, so as to ensure the radiation performance of the antennas. The shield wire 206 may be a coaxial wire, which includes, from outside to inside, a plastic protective layer 2061, a metal shield layer 2062, a metal probe 2063 and a nonconductive medium layer 2064, as shown in FIG. 2C which is a cross-sectional diagram illustrating a coaxial wire. In addition to the coaxial wire, the shield wire 206 may be other connection wires which may shield interference of the metal back cover on the communication signal, which is not concretely limited by embodiments of the present disclosure.

The nonconductive material may be plastic, glass, rubber, etc., which is not concretely limited by embodiments of the present disclosure. The shape and diameter of the opening 205 may be preset based on the diameter and the cross-sectional shape of the shield wire, which is not concretely limited by embodiments of the present disclosure.

It should be noted that the plurality of antenna units 203 are all planar inverted-F antennas (PIFA). The plurality of antenna units 203 may be arranged on an upper portion or a lower portion of the outer surface of the metal back cover, as shown in FIG. 2B. The plurality of antenna units 203 may include at least a WiFi antenna, a GPS antenna and a communication antenna. The communication antenna may further include a high frequency communication antenna and a low frequency communication antenna, for example, GSM (Global System for Mobile Communication) antenna, CDMA (Code Division Multiple Access) antenna, TD-SCDMA (Time Division-Synchronous Code Division Multiple) antenna, LTE (Long Term Evolution) antenna and the like, which is not concretely limited by embodiments of the present disclosure. FIG. 2B merely illustrates a WiFi antenna and a GPS antenna disposed on the upper portion of the metal back cover 201 and a communication antenna disposed on the lower portion of the metal back cover. The specific position of each of the antenna units is not limited by embodiments of the present disclosure. The WiFi antenna and the GPS antenna all include the ground portion and the feed portion.

The distances between the antenna units and the upper portion or the lower portion of the outer surface of the metal back cover 201 may be preset by designers.

It should be noted that the metal back cover, the nonconductive material and the plurality of antenna units are sprayed with the same color so as to ensure aesthetics of the terminal, the color may be gold, silver, black, rose gold, pink, white and the like, which is not concretely limited by embodiments of the present disclosure.

In order to improve the flexibility and diversity of the design, the relationship between the metal back cover and the nonconductive material may be one of the two following relationships.

In the first relationship, the entire outer surface of the metal back cover 201 is overlaid with the nonconductive material 202.

In the second relationship, a part of the outer surface of the metal back cover 201 is overlaid with the nonconductive material 202, wherein the part of the outer surface corresponds to positions of the plurality of antenna units, that is, the nonconductive material 202 merely exist on the area of the metal back cover 201 overlapping with the plurality of the antenna units 203.

Figure 2D:
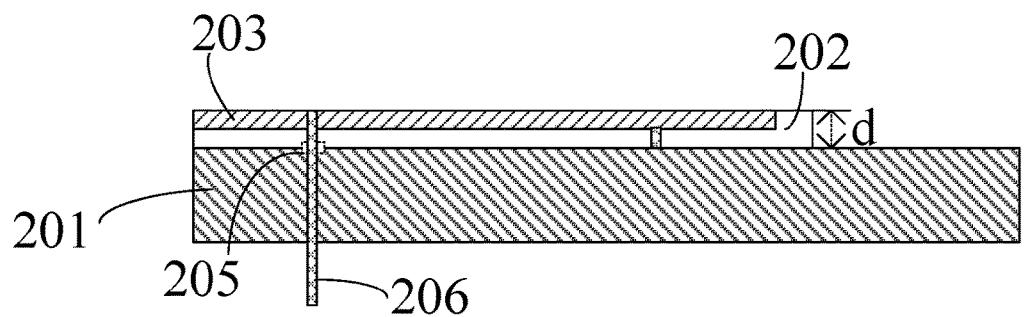
FIG. 2D is a schematic diagram illustrating an antenna unit being embedded into a nonconductive material according to an exemplary embodiment.

For the purpose of reducing the total thickness of the nonconductive material 202 and the plurality of the antenna units 203 so as to reduce the thickness of the terminal and improve the aesthetics of the terminal, the plurality of antenna units 203 may be embedded into the nonconductive material 202 and the upper surfaces of the plurality of antenna units 203 are aligned with the upper surface of the nonconductive material 202, as shown in FIG. 2D, which is a schematic diagram illustrating an antenna unit being embedded into a nonconductive material.

It should be noted that, when the antenna units are embedded into the nonconductive material, it is required to ensure that the thickness of the plurality of antenna units is less than thickness of the nonconductive material, so as to avoid the antenna units from contacting the metal back cover which leads to abnormal operations of the antenna units.

It should be noted that, in general cases, when the antenna units are disposed on the inner surface of the metal back cover (i.e., inside the terminal housing), a certain area of clearance region inside the terminal housing should be reserved for the antenna units so as to ensure that there is no influence on the antennas by other circuits, and ensure the normal operation of the antenna units. Besides, there is no any element in the clearance region. However, in embodiments of the present disclosure, the antenna units are disposed outside the metal back cover, so the antenna units may work normally without reserving the clearance region inside the terminal housing, which can save the inner space of the terminal housing, improve the utilization of the inner space of the terminal housing and also reduce the size of the terminal.

It should be noted that, in a specific embodiment, the nonconductive material 202 is casted on the lower surface of the plurality of antenna units 203 firstly, and then the nonconductive material 202 and the plurality of antenna units 203 are fixed on the outer surface of the metal back cover 201; alternatively, the nonconductive material 202 is fixed on the outer surface of the metal back cover 201 firstly, and then the antenna units are arranged on the nonconductive material, which is not concretely limited by embodiments of the present disclosure.

Figure 3:
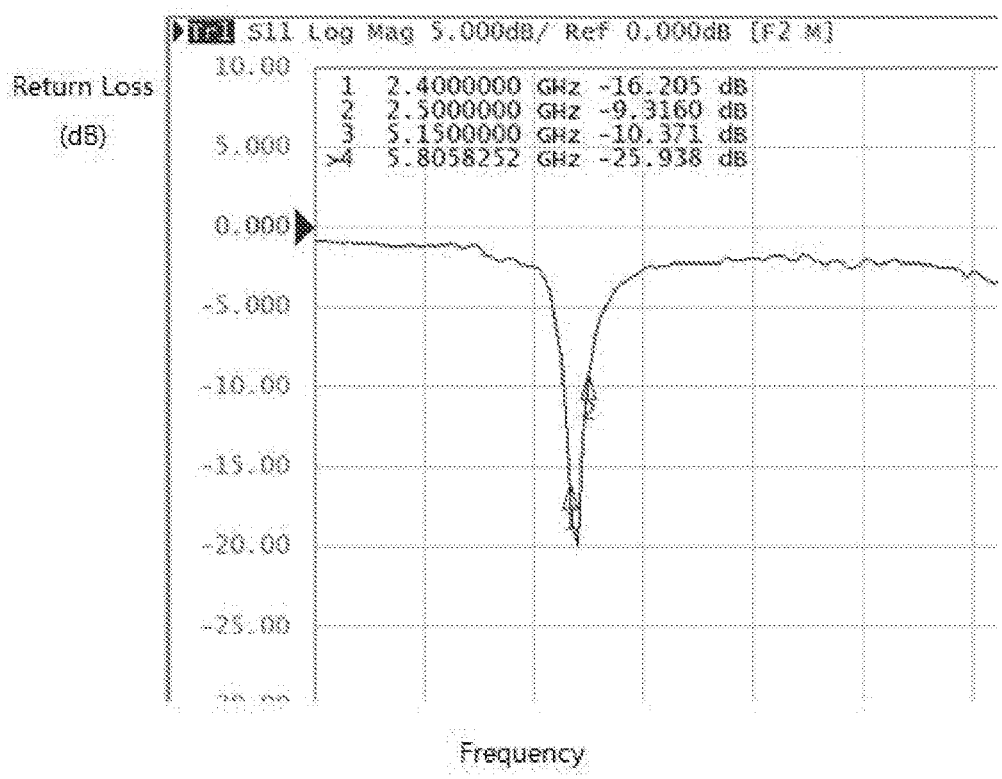
FIG. 3 is a Return Loss (RL) curve of a WiFi antenna according to an exemplary embodiment.

FIG. 3 is a Return Loss (RL) curve of a WiFi antenna according to an exemplary embodiment. The WiFi antenna is disposed on the upper portion of the outer surface of the metal back cover 201, as shown in FIG. 2B. The distance between the top of the WiFi antenna and the top of the metal back cover is 5 mm. The WiFi antenna may be operated at the frequency band of 2.4G. As shown in FIG. 3, the RL of the WiFi antenna is less than −5 dB nearby the frequency of 2.4 GHz, the least RL may reach −20 dB, which meets the design requirement.

Figure 4:
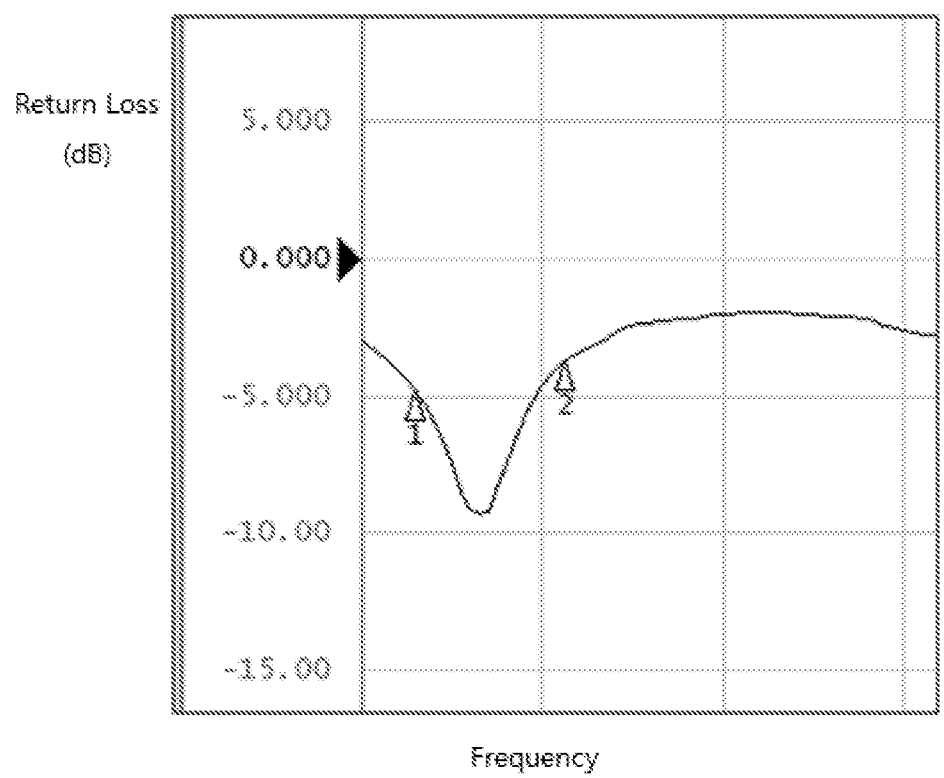
FIG. 4 is a RL curve of a GPS antenna according to an exemplary embodiment.

FIG. 4 is a RL curve of a GPS antenna according to an exemplary embodiment. The GPS antenna is disposed on the upper portion of the outer surface of the metal back cover 201, as shown in FIG. 2B. The distance between the top of the WiFi antenna and the top of the metal back cover is 5 mm. The WiFi antenna may receive the communication signals form L1 wave band which corresponds to the frequency of 1575.42 MHz. As shown in FIG. 3, the RL of the WiFi antenna is less than −5 dB nearby the frequency of 1575.42 MHz, the least RL may reach −5 dB, which meets the design requirement.

A terminal housing is provided in an embodiment of the present disclosure. the ground portions of the antenna units are connected with the metal back cover, and the feed portions of the antenna units are connected with the RF front-end of a PCB, such that the antenna units and the RF front-end may constitute a receiving path or a transmitting path; and due to the antenna units are arranged outside the terminal housing, the receiving and transmitting of signals by the antenna units would not be affected when the terminal housing is all-metal, therefore, the purpose of designing a all-metal terminal housing may be achieved. Furthermore, arranging the antenna units outside the terminal housing may save the inner space of the terminal housing.

A terminal is also provided according to an embodiment of the present disclosure, the terminal includes the terminal housing described in the above embodiments and all the structures and functions of the terminal housing, which will not be repeated herein. Notably, the terminal further includes a terminal front housing, a terminal display and other electronic components in the terminal. The plurality of antenna units included in the terminal housing are in cooperation with the other components in the terminal to achieve the communication function of the terminal, components of the terminal are not limited concretely by the present disclosure.

Other embodiments will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A terminal housing, comprising:
   a metal back cover, the metal back cover comprising an opening and the outer surface of the metal back cover being overlaid with a nonconductive material;
   a printed circuit board (PCB) arranged on the inner surface of the metal back cover;
   a plurality of antenna units arranged on the nonconductive material, each of the plurality of antenna units comprising:
   a ground portion, the ground portion passing through the nonconductive material and being connected with the outer surface of the metal back cover; and
   a feed portion, the feed portion being connected with a radio frequency (RF) front-end of the PCB via a shield wire, the shield wire passing through the nonconductive material and entering into the terminal housing via the opening;
   wherein the plurality of antenna units are embedded into the nonconductive material, and upper surfaces of the plurality of antenna units are aligned with the upper surface of the nonconductive material, and wherein thickness of the plurality of antenna units is less than thickness of the nonconductive material.

2. The terminal housing of claim 1, wherein the ground portion is fixedly connected with the outer surface of the metal back cover.

3. The terminal housing of claim 1, wherein the ground portion is connected with the outer surface of the metal back cover by surface contact.

4. The terminal housing of claim 3, wherein the connection by surface contact is a connection by a flexure strip.

5. The terminal housing of claim 1, wherein the shield wire is a coaxial wire comprising from outside to inside:
   a plastic protective layer;
   a metal shield layer,
   a metal probe; and
   a nonconductive medium layer.

6. The terminal housing of claim 1, wherein the PCB is a strip line comprising:
   a top ground layer;
   a bottom ground layer; and
   an intermediate layer for transmitting signals, the shield wire being connected with the intermediate layer of the RF front-end.

7. The terminal housing of claim 6, wherein the RF front-end is stair-step shaped, so as to ensure impedance matching between the shield wire and the RF front-end.

8. The terminal housing of claim 1, wherein the RF front-end is stair-step shaped, so as to ensure impedance matching between the shield wire and the RF front-end.

9. The terminal housing of claim 1, wherein the metal back cover, the nonconductive material and the plurality of antenna units are sprayed with the same color.

10. The terminal housing of claim 1, wherein the entire outer surface of the metal back cover is overlaid with the nonconductive material.

11. The terminal housing of claim 1, wherein a part of the outer surface of the metal back cover is overlaid with the nonconductive material, and the part of the outer surface corresponds to positions of the plurality of antenna units.

12. The terminal housing of claim 1, wherein the plurality of antenna units are arranged on an upper portion or a lower portion of the outer surface of the metal back cover.

13. The terminal housing of claim 1, wherein the plurality of antenna units are all planar inverted-F antennas (PIFA).

14. The terminal housing of claim 1, wherein the plurality of antenna units includes at least a Wireless Fidelity (WiFi) antenna, a global positioning system (GPS) antenna and a communication antenna.

15. A terminal, comprising the terminal housing of claim 1.

* * * * *